(12) United States Patent
Wang et al.

(10) Patent No.: US 12,067,357 B2
(45) Date of Patent: Aug. 20, 2024

(54) UNIFIED INTERNET INTEGRATION SYSTEM FOR A POSITIONING-ORIENTED ARCHITECTURE AND THE METHOD THEREOF

(71) Applicants: Qiang Wang, San Jose, CA (US); Jin Wang, Lang Fang (CN); Yong Wang, SuzHou (CN)

(72) Inventors: Qiang Wang, San Jose, CA (US); Jin Wang, Lang Fang (CN); Yong Wang, SuzHou (CN)

( * ) Notice: Subject to any disclaimer, the term of this patent is extended or adjusted under 35 U.S.C. 154(b) by 996 days.

(21) Appl. No.: 17/037,337

(22) Filed: Sep. 29, 2020

(65) Prior Publication Data

US 2021/0012911 A1   Jan. 14, 2021

Related U.S. Application Data

(63) Continuation-in-part of application No. 16/200,516, filed on Nov. 26, 2018, now abandoned, which is a continuation-in-part of application No. 15/664,152, filed on Jul. 31, 2017, now abandoned.

(51) Int. Cl.
*G06F 40/177* (2020.01)
*G16Y 40/30* (2020.01)
*G16Y 40/60* (2020.01)

(52) U.S. Cl.
CPC ............ *G06F 40/177* (2020.01); *G16Y 40/30* (2020.01); *G16Y 40/60* (2020.01)

(58) Field of Classification Search
CPC ............................... G16Y 40/30; G16Y 40/60
See application file for complete search history.

(56) References Cited

U.S. PATENT DOCUMENTS

| 6,539,396 | B1* | 3/2003 | Bowman-Amuah | ....................... G06F 16/289 707/999.102 |
| 2006/0129691 | A1* | 6/2006 | Coffee | .................... H04L 67/04 709/230 |
| 2015/0200738 | A1* | 7/2015 | Wetterwald | ........... H04W 16/02 370/442 |
| 2016/0323706 | A1* | 11/2016 | Splaine | .................. H04W 4/023 |
| 2016/0381146 | A1* | 12/2016 | Zhang | ................... H04L 67/141 709/228 |
| 2018/0063672 | A1* | 3/2018 | Krebs | .................... H04W 4/029 |

* cited by examiner

*Primary Examiner* — Mong-Shune Chung
(74) *Attorney, Agent, or Firm* — Changi Wu; Changi Wu Law Office (57) ABSTRACT

A unified Internet integration system for a positioning-oriented architecture (POA) comprises a controllable icon positioning information management service (CIPIMS) server; an icon positioning object information bus; at least one icon positioning resource object; at least one network application; at least one network; wherein the POA further comprises at least one unique icon positioning identification number, at least one icon positioning resource, at least one icon positioning resource space management, at least one icon positioning resource management, at least one icon positioning external resource links with Internet protocol address, and at least one icon positioning resource status management; and the method thereof.

20 Claims, 9 Drawing Sheets

UNIFIED INTERNET INTEGRATION SYSTEM FOR A POSITIONING-ORIENTED ARCHITECTURE AND THE METHOD THEREOF

CROSS-REFERENCE RELATED TO RELATED APPLICATIONS

This application is a continuation-in-part of commonly-owned, same inventors, presently co-pending U.S. Nonprovisional patent application Ser. No. 16/200,516, filed Nov. 26, 2018. The presently co-pending application Ser. No. 16/200,516 is a continuation-in-part of commonly-owned, same inventors, abandoned U.S. Nonprovisional patent application Ser. No. 15/664,152, filed Jul. 31, 2017.

BACKGROUND

Since the invention of computers and the Internet in the last century, the computers and especially the Internet have penetrated almost all aspects of human society and are profoundly changing and transforming the lifestyle of all mankind as ever before, it reconstructs the new civilization and future of mankind. This is unmatched by all the technologies and inventions of the past.

With the rapid development of computer software and the Internet, various software architecture designs for computer software and the Internet are constantly being invented, improved, and updated to meet the dramatic requirements of the explosive growth of human beings for the Internet. The track of the development was from the earliest message-oriented, object-oriented, service-oriented architecture (SOA), and the Resources Oriented Architecture (ROA) based on the invention of the Representational State Transfer (REST) architectural style in more than 20 years ago. Today, the development of ROA is becoming the mainstream of architectural design style in the current software development for Internet and enterprises throughout the world.

With the continuous advancement of information science, it is realized that message-oriented architecture solves a major portion of the most basic problems of information communication between different applications. The object-oriented architecture is obviously a big step, and the service-oriented architecture is a leap on the internet. Finally, the Resource-Oriented Architecture (ROA) has the intention to try to integrate the Internet of Things (IoT) into the Internet. Looks like that the ROA is the most promising approach because it has the broadest coverage so far and the architecture design of the HTTP REST API has been a huge success in the Internet field. In 2010, approximately 74% of the web applications were using HTTP REST APIs.

However, there are fatal defects in message-oriented architecture, SOA, ROA, and other traditional computer architecture that cause internet integration to fail. To date, no systematic description has been found on the fundamental issues of information systems and the Internet, which defines clearly that the scope and boundaries or cardinalities of all these basic elements and resources of the Internet and information systems. Due to these major fatal genetic defects, there is no way for the traditional internet architecture designs to integrate IoTs or other local area networks into the Internet as a whole by using ROA or other architecture designs.

It has encountered insurmountable obstacles. It's very difficult to dynamically determine the accurate satellite-based radio-navigation system (Global Positioning System by the US, etc.) coordinate the position of any Internet resource by using the simplest and most convenient method available so far. Because all traditional internet architecture designs do not take any consideration for the necessity and extreme importance of GPS positioning coordinate resources. There is no consideration of any requirements for the positioning of resources in traditional Internet architecture. Therefore, today, the coordinate positioning resources and internet architecture design are completely independent, separated, and irrelevant. If you open any API standards in traditional Internet architecture designs, you can't see any important position of the GPS icon positioning in the root element of a data structure.

BRIEF SUMMARY OF THE INVENTION

This Brief Summary is included so as to introduce, in an abbreviated form, various topics to be elaborated upon below in the Detailed Description. This Brief Summary is not intended to identify key or essential aspects of the claimed invention. This Brief Summary is similarly not intended for use as an aid in determining the scope of the claims. The current invention is directed to a unified Internet integration system for a unified Internet integration system for a positioning-oriented architecture (POA) comprises a controllable icon positioning information management service (CIPIMS) server; an icon positioning object information bus; at least one icon positioning resource object; at least one network application; at least one network; wherein the CIPIMS server further comprises a memory, an icon positioning resource object database, and a computer processor further comprising a POA object receiver module, a POA object parser module, a POA object data validator module, a POA object processor and transformer module, a POA object assembler module, a POA object security module, and a POA object sender module; wherein the POA further comprises at least one unique icon positioning identification number, at least one icon positioning resource, at least one icon positioning resource space management, at least one icon positioning resource management, at least one icon positioning external resource links with Internet protocol address, and at least one icon positioning resource status management; wherein the at least one icon positioning resource comprises at least a longitude value, a latitude value, and an altitude value, or alternatively a predefined convention rule; wherein the at least one icon positioning resource space management comprises at least one icon positioning resource space and wherein the at least one icon positioning resource space management the at least one icon positioning resource can be created, deleted, added, cloned, linked, updated by the at least one icon positioning resource space management; wherein the at least one icon positioning resource management further comprises at least one icon group, wherein the at least one icon group can contain the at least one icon positioning resource object, where in the at least one icon group can be created, deleted, added, clone, link, updated, sent, published, canceled, blacklisted, notified, blocked, accepted, included, and excluded by the at least one icon positioning resource management; wherein the at least one icon positioning external resource links with Internet protocol address may comprise at least one Internet protocol address under a resource-oriented architecture; wherein each of the at least one Internet protocol address may further comprise at least one service under a service-oriented architecture; wherein the at least one icon positioning resource status management comprises a status of the at least one icon positioning resource object and responses to a request of the status; wherein each of the at least one icon positioning resource space comprises at least one web page; wherein the at least one icon positing resource object is from an online activity, and wherein the CIPIMS server communicates with the at least one icon positioning resource object through the icon positioning object information bus; wherein the icon positioning resource object database stores a plurality of information of the at least one icon positioning resource object; and wherein the at least one icon positioning resource object is exchanged between the CIPIMS server and the at least one network through the icon positioning object information bus.

BRIEF DESCRIPTION OF THE DRAWINGS

It should be understood that the drawings are merely representative, are not necessarily drawn to scale, and are not intended to limit the subject matter of this application.

DETAILED DESCRIPTION

Before the present invention is described in greater detail, it is to be understood that this invention is not limited to particular embodiments described, and as such may, of course, vary. It is also to be understood that the terminology used herein is for the purpose of describing particular embodiments only, and is not intended to be limiting since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all terms used herein have the same meaning as commonly understood by one of ordinary skill in the art to which this invention belongs. Although any methods and materials similar or equivalent to those described herein can be used in the practice or testing of the present invention, some potential and exemplary methods and materials may now be described. Any and all publications mentioned herein are incorporated herein by reference to disclose and describe the methods and/or materials in connection with which the publications are cited. It is understood that the present disclosure supersedes any disclosure of an incorporated publication to the extent there is a contradiction.

It must be noted that as used herein and in the appended claims, the singular forms "a", "an", and "the" may also include the plural referents unless the context clearly dictates otherwise.

It is further noted that the claims may be drafted to exclude any element that may be optional. As such, this statement is intended to serve as antecedent basis for use of such exclusive terminology as "solely", "only" and the like in connection with the recitation of claim elements, or the use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. The present invention is directed to a unified Internet integration (UII) system for a positioning-oriented architecture. A UII system for a positioning-oriented architecture is a new type of software architecture for designing and developing in the form of internetworking of Internet objects with the Representational State Transfer (REST).

Figure 1:
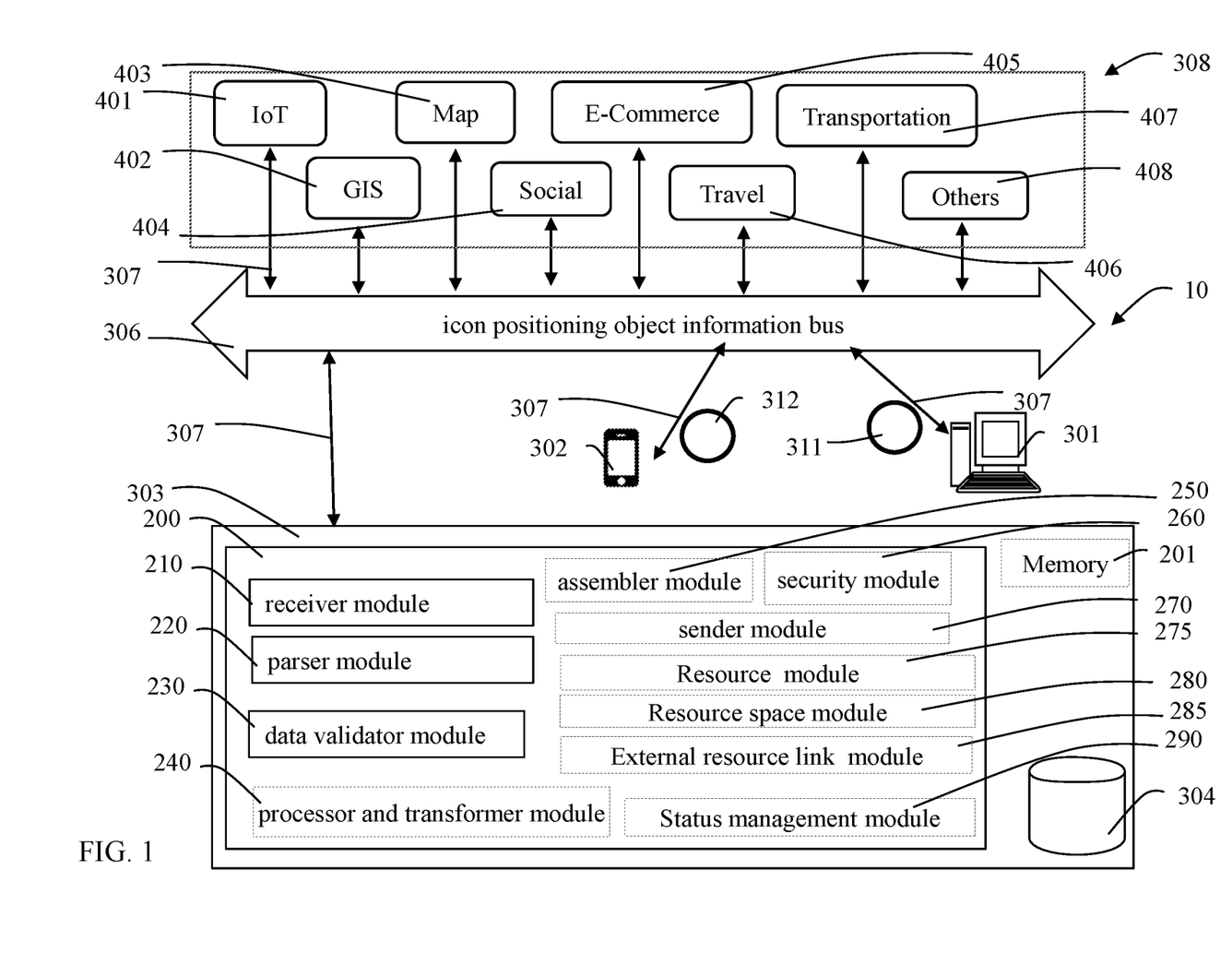
FIG. 1 is a simplified diagram that illustrates an embodiment of a UII system.
Figure 3:
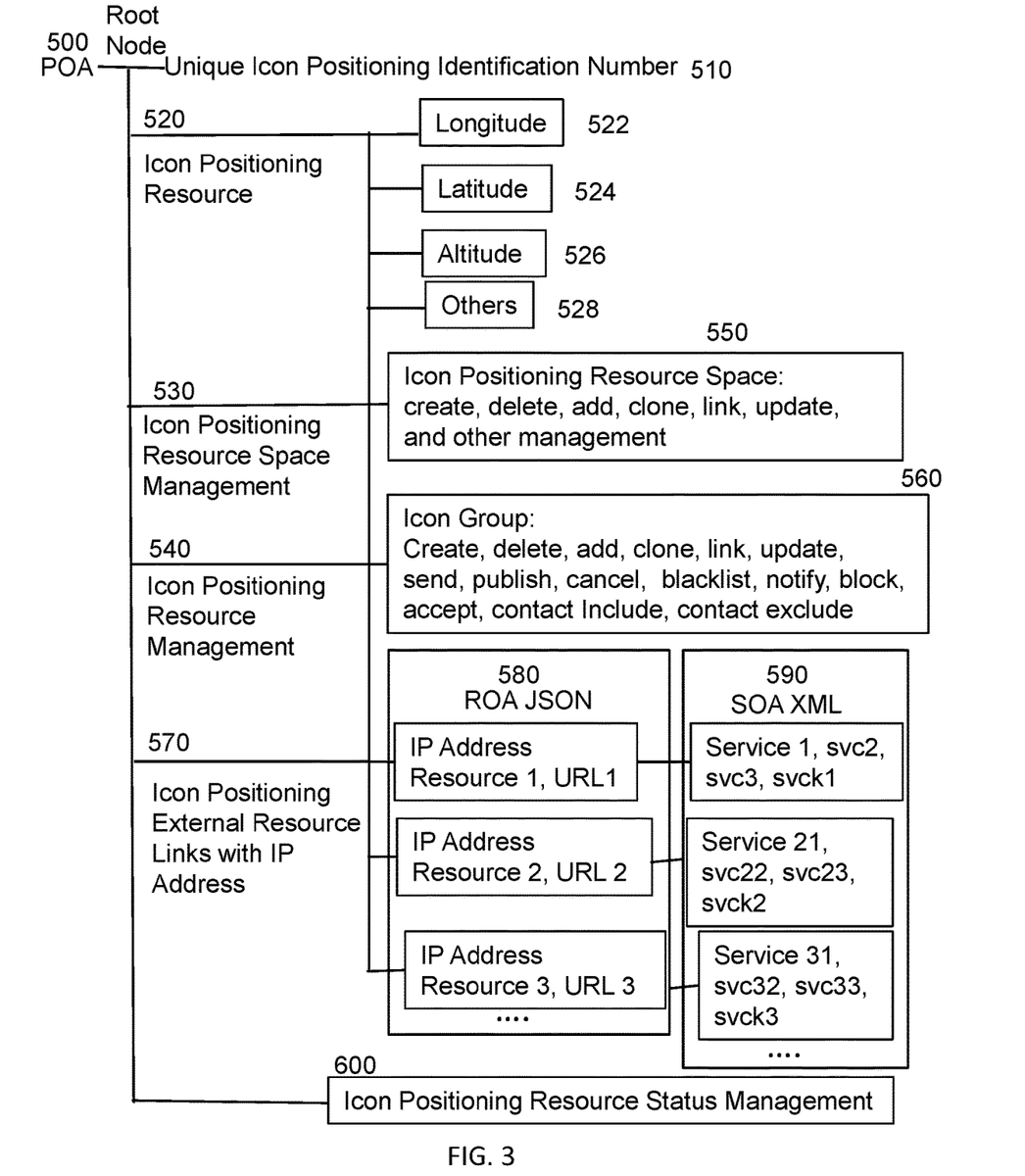
FIG. 3 is a simplified chart showing an embodiment of a data structure of POA.
Figure 4:
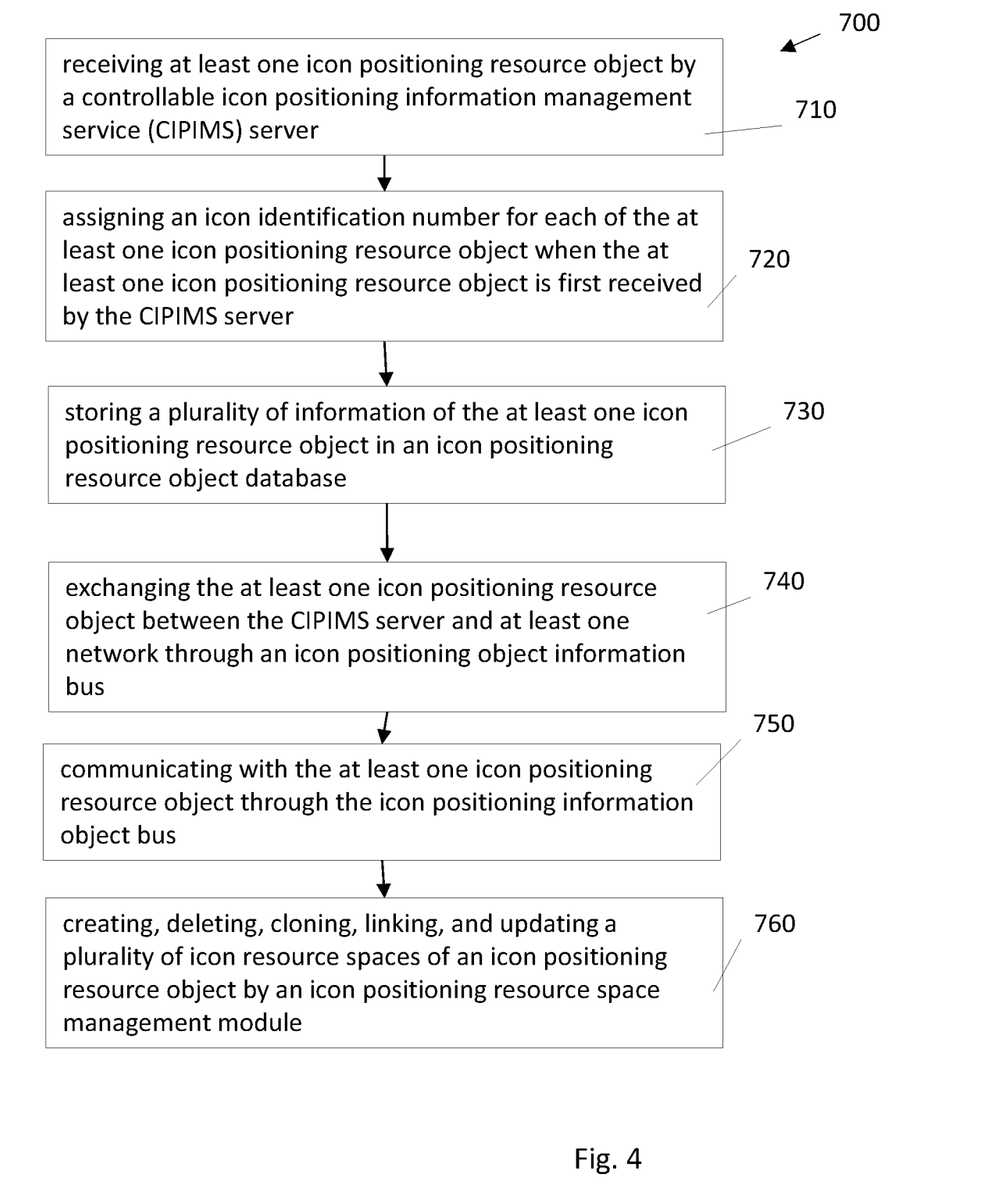
FIG. 4 is a simplified flowchart showing an embodiment of a UII method.

As shown in FIG. 1 and FIG. 3, in one embodiment, A unified Internet integration (UII) system 10 for a positioning-oriented architecture (POA) comprises a controllable icon positioning information management service (CIPIMS) server 303; at least one network 307, an icon positioning object information bus 306 at least one icon positioning resource object 311; at least one network application 308; wherein the CIPIMS server 303 further comprises a memory 201, an icon positioning resource object database 304, and a computer processor 200 further comprising a POA object receiver module 210, a POA object parser module 220, a POA object data validator module 230, a POA object processor and transformer module 240, a POA object assembler module 250, a POA object security module 260, and a POA object sender module 270; wherein the POA further comprises at least one unique icon positioning identification number 510, at least one icon positioning resource 520, at least one icon positioning resource space management 530, at least one icon positioning resource management 540, at least one icon positioning external resource links with Internet protocol address 570, and at least one icon positioning resource status management 600; wherein the at least one icon positioning resource 520 comprises at least a longitude value 522, a latitude value 524, an altitude value 526, or alternatively based on a predefined convention rule 528; wherein the at least one icon positioning resource space management 530 comprises at least one icon positioning resource space 550 and wherein the at least one icon positioning resource space management the at least one icon positioning resource can be created, deleted, added, cloned, linked, updated by the at least one icon positioning resource space management 530; wherein the at least one icon positioning resource management 540 further comprises at least one icon group 560, wherein the at least one icon group 560 can contain the at least one icon positioning resource object 312, where in the at least one icon group can be created, deleted, added, clone, link, updated, sent, published, canceled, blacklisted, notified, blocked, accepted, included, and excluded by the at least one icon positioning resource management 540; wherein the at least one icon positioning external resource links with Internet protocol address 600 may comprise at least one Internet protocol address 580 under a resource-oriented architecture; wherein each of the at least one Internet protocol address 580 may further comprise at least one service 590 under a service-oriented architecture; wherein the icon positioning resource status management 600 comprises a status of the at least one icon positioning resource object and responses a request of the status; wherein each of the at least one icon positioning resource space comprises at least one web page or at least one WebView; wherein the at least one icon positing resource object 311 is from an online activity from a device 301, and wherein the CIPIMS server 303 communicates with the at least one icon positioning resource object 311 through the icon positioning object information bus 306; wherein the icon positioning resource object database 304 stores a plurality of information of the at least one icon positioning resource object 311; and wherein the at least one icon positioning resource object 311 is exchanged between the CIPIMS server 303 and the at least one network 307 through the icon positioning object information bus 306. The online activity can be from a device 301. Similarly, another online activity from another device 302 can be a mobile device which has another one of the at least one icon positioning resource object 312.

An icon positioning resource object will send a time poller or timer continuously for every predefined period, for example, 10 seconds, to the icon positioning resource status management 600 or icon positioning resource status management module 290 of the CIPIMS server 303 to request the status changes for all icon positioning resource objects collected in an application from a user's device. The status of can be associated with the following cases selected from, but not limited to, fire, emergency, flood, blizzard, strikes, hijack, car accident, help, SOS, ambulance, violence, killing, others Each case has a special symbol to represent it. Once one or more of those cases happen, the status associated with the situation of the icon positioning resource object will be sent by the transferred from the icon positioning resource status management 600 or the icon positioning resource status management module 290 of the icon positioning information management service (CIPIMS) server to the application requesting the status and all the symbols of the status will be displayed on the icons in the application allowing the user to monitor all different emergency cases.

A webpage or tab(s) used as a container inside the application of the user icon to hold or contain all the icon positioning resource objects, properties, and status. The status for each icon positioning resource object is collected by the process of the CIPIMS server from each application. A user has no privilege to change any status of any icon positioning resource object in the application of the user's device except authorization or permission.

In another embodiment, as shown in FIG. 1, a unified Internet integration (UII) system 10 for a positioning-oriented architecture (POA) comprises a controllable icon positioning information management service (CIPIMS) server 303; at least one network 307, an icon positioning object information bus 306 at least one icon positioning resource object 311; at least one network application 308; wherein the CIPIMS server 303 further comprises a memory 201, an icon positioning resource object database 304, and a computer processor 200 further comprising a POA object receiver module 210, a POA object parser module 220, a POA object data validator module 230, a POA object processor and transformer module 240, a POA object assembler module 250, a POA object security module 260, and a POA object sender module 270; an icon positioning resource management module 275, an icon positioning resource space management module 280, an icon positioning external resource links module 285, and an icon positioning resource status management module 290; wherein each of the at least one icon positioning resource object 311 further comprising at least one icon positioning resource space; wherein each of the at least one icon positioning resource space comprises at least a plurality of web pages, wherein the CIPIMS server 303 assigns an Unique Icon Positioning Identification Number for each of the at least one icon positioning resource object 311 when the at least one icon positioning resource object 311 is first received by the process of the CIPIMS server 303; wherein the icon positioning resource space management module 280 can create, delete, add, clone, link, and update the at least one icon positioning resource space 550; wherein the icon positioning resource management module 275 further comprises at least one icon group, wherein the at least one icon group 560 can contain the at least one icon positioning resource object; wherein the icon positioning resource management module 275 can create, delete, add, clone, link, update, send, publish, cancel, blacklist, notify, block, accept, exclude, and include the at least one icon group and the at least one icon positioning resource object; wherein the Unique Icon Positioning Identification Number 510 is assigned based on at least a latitude value 522, a longitude value 524, and an altitude value 526 of the at least one icon positioning resource object 311 or alternatively based on a predefined convention rule 528; wherein the at least one icon positing resource object 311 is from an online activity from a device 301, and wherein the CIPIMS server 303 communicates with the at least one icon positioning resource object 311 through the icon positioning object information bus 306; wherein the icon positioning resource object database 304 stores a plurality of information of the at least one icon positioning resource object 311; and wherein the at least one icon positioning resource object 311 is exchanged between the CIPIMS server 303 and the at least one network 307 through the icon positioning object information bus 306. The online activity can be a device 301. Similarly, another online activity from another device 302, such as a mobile device, can be a mobile device which has another one of the at least one icon positioning resource object 312.

Each of the at least one icon positioning resource object 311 or 312, for example, further comprising at least one icon positioning resource space. Each of the at least one icon resources space may comprise resources and information available in the Internet or intranet networks, such as service, message, Internet protocol address, websites, mobile apps, applications, software, databases, Internet blogs, social media (e.g., Facebook, YouTube, Twitter), demand-side platform, supply-side platforms, data brokers, and similar online resources.

As shown in FIG. 1, the unified Internet integration system 10 further comprises an icon positioning resource space management module 280 that comprises a plurality of operations comprising creating, deleting, cloning, linking, and updating the at least one icon positioning resource space of an icon positioning resource object 311.

All icon positioning resource objects transferred in the icon positioning object information bus to contain all the information used and exchanged by all the different types of network platform 308, such as IoTs 401, GIS platform 402, map platform 403, social platform 404, E-commerce 405, travel platform 406, transportation platform 407, and other platforms 408 on the Internet, to communicate with each other of the icon positioning resource objects. A Unique Icon Positioning Identification Number is assigned to each icon positioning resource object to distinguish from each other. The controllable icon positioning information management service (CIPIMS) server 303 will receive, verify, validate, parse, process, respond, reply, and store all the icon positioning resource objects in the back-end icon positioning resource object databases. CIPIMS server 303 has a lot of applications to be triggered by different processes. Once it receives a request from a client or an application, then it will start to process the icon positioning resource object, authenticate, parse, validate, process, maintain and persist it. The icon positioning object information bus and the CIPIMS server are not only the main aorta and information bus to integrate the icon positioning resources of all different types of network platforms, but also the core framework of the UII.

The current Internet Protocol (IP) address resource is in the integer domain and it has a maximum upper limit of the cardinality (MULC) of first-level infinity, which is a subset of the set of the icon positioning resource objects, which has a MULC of second-level infinity. The current service resource has a MULC of the first level infinity, but the numbers of IP address resources are much bigger than the service resources. Therefore, the service resources can be included as a subset of the IP address resources.

Figure 2A:
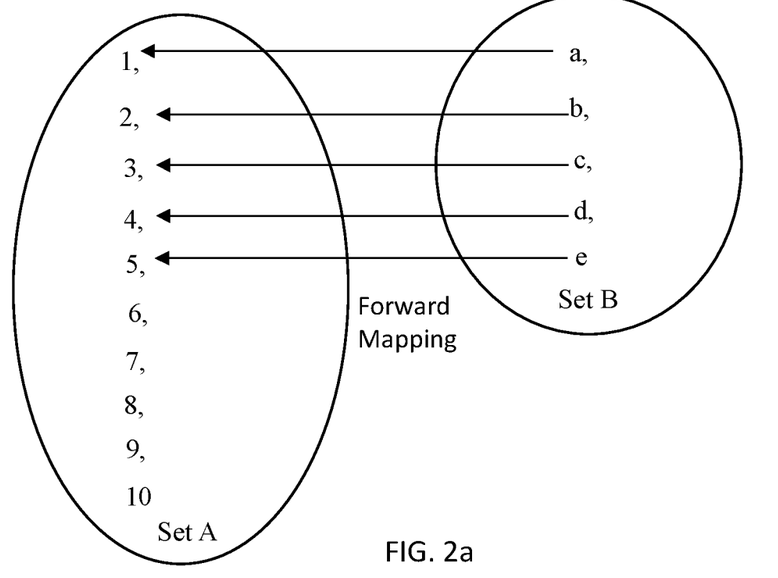
FIG. 2a is a high-level diagram that illustrates forward mapping.
Figure 2B:
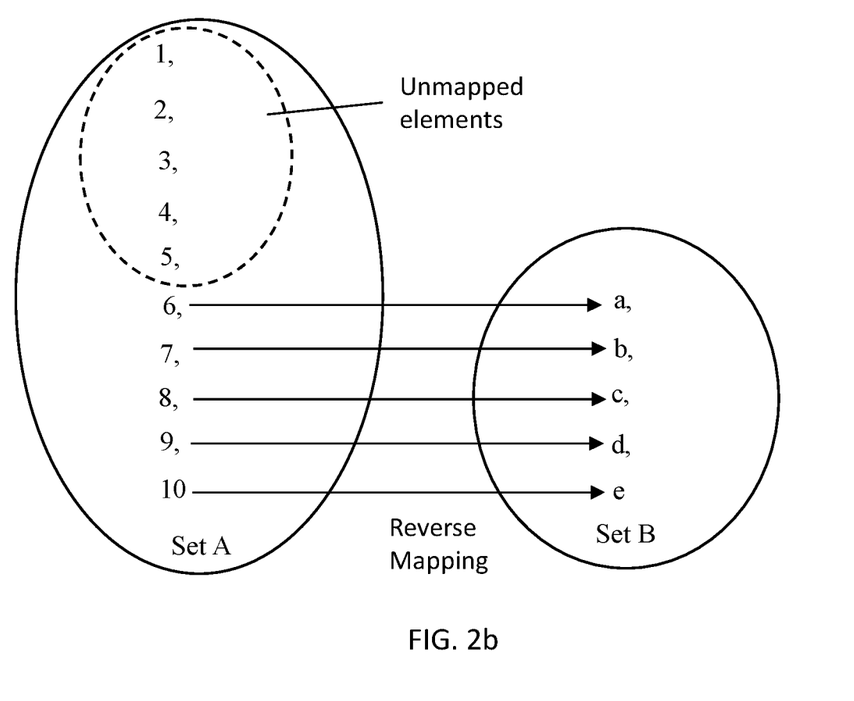
FIG. 2b is a high-level diagram that illustrates reverse mapping.

As shown in FIGS. 2a and 2b, Forward Mapping and Reverse Mapping are illustrated. In FIG. 2a, Forward Mapping refers to the mapping from a set B of elements with a smaller cardinality to a set A of elements with a bigger cardinality. Obviously, in a forward mapping, for a smaller set B of elements, none of the mapping elements are missing. In FIG. 2b, a Reverse Mapping refers to the mapping from a larger set A of elements to a smaller set B of elements. Obviously, in reverse mapping, the set A has more than one element that cannot be mapped to set B, that some elements in the set A can't find any unique mapping element in the set B. Using Cantor's mapping method, forward mapping refers to mapping from a set B with fewer elements to a set A with more elements. Obviously, for a set with fewer elements, there is no missing element of the mapped element of Set B; That is, in a set with fewer elements, all elements can find a unique matching object or item in the set with more elements. The reverse mapping refers to mapping from a set A with more elements to a set B with fewer elements. Obviously, the reverse mapping has more than one mapping element missing, that is, a set A with more elements will have some elements to map to nothing. Some elements in set A can't find a unique matching item in a set B with fewer elements. Only the forward mapping is discussed in the positioning-oriented architecture (POA), and the reverse mapping causes the resource to be lost during mapping.

It is extremely important to determine the relations of primary sets and secondary sets or subordinates, and ones of global and local sets between the sets of different types of resource in the Internet and the Internet of Things (IoT), such as GIS, and all area networks. Since the Internet is a global network, all local area networks such as GIS and Internet of Things (IoT) are the subset of the set of global networks; through the mapping of Cantor's theory of set, all sets of local area networks such as GIS and Internet of Things (IoT) can be mapped into the set of Internets. All information of the basic elements or resources of the global network/internet can be shared in the global Internet environment by both the set of internet and subsets mapped; therefore, the attributes/properties of the Internet with its genetic defects of icon positioning resources will directly have a dramatic impact on the further development of all these subsets mapped. Similarly, if the attributes/properties of the Internet with its genetic defects of icon positioning resources are reconstructed or updated by removing these genetic defects, these updated attributes/properties of the internet with positioning resources will directly improve and promote the further development of these local area networks.

Figure 2C:
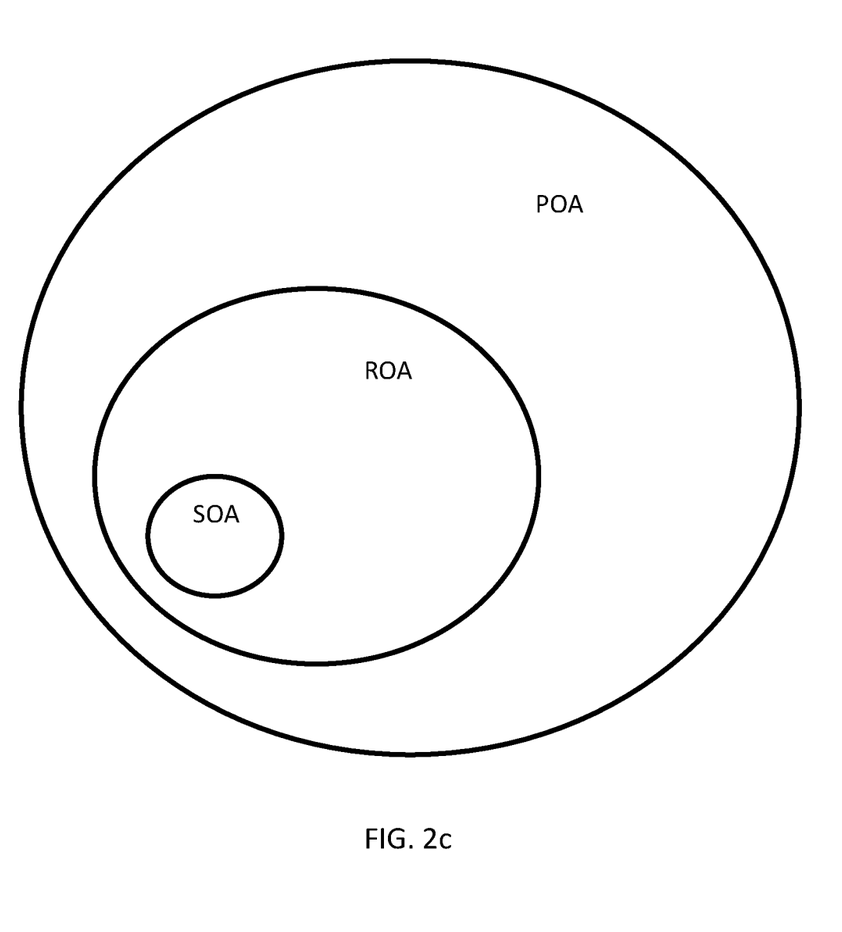
FIG. 2c is a high-level diagram that illustrates the maximum upper limit of the cardinality (MULC) related to SOA, ROA, and POA frameworks.

The IP addresses have the largest value to $2^{132}$ (IPV9) addresses. The GIS can map to maximum unlimited but actual users is much less than internet's one. However, the icon positioning resource object can go up to an unlimited or second level of infinity, which is infinitely larger than any IP addresses. As shown in FIG. 2c, it indicates that all sets of different types of resources (Service Resource, IP Address Resource, and Icon Positioning Resource) have different maximum upper limits of cardinalities (MULC). The relations among Service Oriented Architecture (SOA) that is based on service resources, Resource-Oriented Architecture (ROA) that is based on IP address, and Positioning-Oriented Architecture (POA) that is based on icon positioning resources is shown. SOA is a subset of ROA, which is a subset of a POA. Therefore, POA has the $1^{st}$ level infinity of cardinalities.

The at least one icon positioning resource object can comprise an icon positioning number, an IP address, and a service. An icon positioning resource object may be associated with a human being's daily life, business, commercial, production, or social activities such as entertainment, shopping, hospital, education, tour, transportation, agriculture, manufacturing, etc. The icon positioning resource objects can be used not only in the Internet maps such as Google Map, MapQuest, etc. but also can be used in all other platforms and the applications on the platform, such as but not limited to all types of GIS and all types of IoTs, all types of local area networks.

The one icon positioning resource object may also comprise an icon positioning number, service, an Internet Protocol (IP) address, a message, or a combination thereof. The message may contain a message ID plus message body from a message-oriented platform. The services may be from session management, cached management, database management, image management, supply chain, etc. or input/output from a resources-oriented platform. The IP address can be from a resource-oriented platform.

The at least one network can be an Internet of Things, a Geographical Information System (GIS) platform, an internet map platform, a social platform, an E-commerce platform, a travel platform, or a transportation platform, or any local area networks.

The unified Internet integration (UII) system may comprise an icon positioning resource space management module that comprises a plurality of operations comprising creating, deleting, cloning, linking, and updating a plurality of icon positioning resource spaces of an icon positioning resource object.

In one of the preferred embodiments, an icon positioning resource space comprises a series of web pages or web views associated with each icon positioning resource object. These webpages may display in a tab format or WebView format or other formats to accommodate the users' information. These webpages may contain any contents displayed in normal webpages, such as all kinds of buttons, links, drop-down boxes, text box, etc. When the icon positioning resource objects in applications in computers or mobile devices, a new dialogue box will pop up. Within the dialogue box, there is a webpage consisting of a series of tabs or other webpages that contain a lot of other contents, links and webpages nested each other or layer by layer.

As shown in FIG. 3, in one embodiment, a data structure of the Positioning-Oriented Architecture (POA) 500 used in the system and method of Unified Internet Integration (UII). The data structure framework of the POA comprises at least one unique icon Positioning identification number 510, at least one icon positioning resource 520, wherein the at least one icon positioning resource 520 further comprises a longitude, from GPS positioning systems for example, an icon positioning resource object space management 503, an icon positioning resource management 504 to manage the at least one icon positioning resource object 504, an icon positioning external resource link management 505, wherein the icon positioning external resource link management further comprises a ROA 507 and a SOA 508, and an icon positioning resource object current status and its status management interfaces 506. The icon positioning resources further comprises longitude, latitude, altitude, and other resources 509. In one embodiment, the icon positioning resource object space management 503 further comprises creation of icon positioning resource space, deletion of icon positioning resource space, addition, clone, link, update, and other functions of icon positioning resource space by inserting, creating, cloning, deleting, linking, and updating the new or existing tabs or web views. The icon positioning resource management 504 or icon positioning resource management module 275 further comprises at least one icon group, such as work icon group, daily icon group, social icon group, relative icon group, health icon group, education icon group. The icon positioning resource management 504 or icon positioning resource management module 280 the further comprises at least one icon group, which further comprises a plurality of operations, for example, to send group, to publish, to add or remove some icons to or from the blacklist, to add, to notify, to reject, to include, to contact, to exclude, etc. The ROA 507 further comprises a plurality of IP resources or URLs. The SOA 508 further comprises a plurality of services.

As shown in FIG. 1, in one embodiment, the unified Internet integration (UII) system wherein one of the at least one icon positioning resource object 311 can send a request and receive an authorization through the CIPIMS server 303 to access and manage the at least one icon positioning resource space of another one of the at least one icon positioning resource object 312 when there are more than two of the at least one icon positioning resource object; and wherein the one of the at least one icon positioning resource object and another one of the at least one icon positioning resource can connect and communicate directly after the CIPIMS server 303 establish a connection tunnel between the one and the another one of at least one icon positioning resource objects 311 and 312.

In one of the embodiments, for example, a manager A who has a cellphone with the icon positioning resource object A in one network such as Google map in USA. The manager wants not only communicate but also control and invoke or trigger other customer B with B's icon positioning resource object B which is associated an IoT URL of a factory control system in another network in another continent such as French, to share the data, send the service request, and get expected response from customer B. Both network providers are totally different. One is Google map and another is France's local IoT company. The icon positioning resource object A is a cellphone user and has a unique icon positioning resource object Identification number A0000001 assigned by a CIPIMS server. For requesting to view, control object B's overseas' factory workshop through B's IoT network, A will send the request of icon positioning resource object containing the following data to the CIPIMS server such as:

(1) Identification number B0000002 of the icon positioning resource object B,
(2) B0000002's factory IoT's network URL,
(3) a message of A0000001 data for authentication or authorization,
(4) a plurality of services needed to be invoked in B0000002's factory's IoT control panel, and
(5) a response data format required to be returned to A.

In this example, the CIPIMS server receives the icon positioning resource object A's request. The CIPIMS server will parse, validate, verify, authenticate, and authorize, transform, and process the icon positioning resource object A with data format accepted by IoT network of B. The CIPIMS server will send the icon positioning resource object A transformed/reformatted to URL specified in the icon positioning resource object A's request. A webserver/cloud of the URL specified will receive the A's request, then will do the same thing like parse, validate, verify, authenticate, and authorize, transform, and process the icon positioning resource object A with data format accepted by IoT network of B. If all succeed, then the webserver/cloud prepare the response for the icon positioning resource object A to meet the icon positioning resource object A's requirements such as an authority to access and control B's factory's control panel; the assembly all data processed and send the icon positioning resource object B's response object back to the CIPIMS server.

In this example, the CIPIMS server receives B's response then do a routine job again by paring, validating, verifying, and converting the data format of the icon positioning resource object B into that of the icon positioning resource object A so the icon positioning resource object A can use it. The CIPIMS server sends B's response processed to manager A's cellphone. Manager A's cellphone receives the icon positioning resource object B's response and parses it to get all instructions. After handshaking, the icon positioning resource object A sends a confirmation to the CIPIMS server to permit the CIPIMS server to set up a connection tunnel to connect the icon positioning resource objects A and B. so far, the icon positioning resource objects A and B can connect. Through this connection, the icon positioning resource object A get permission to link the icon positioning resource object B's URL of IoT and access all permitted resources such as the factory control panel, to view and run all operations in the workshop, to start/pause/stop/resume any machines in the shop, to monitor all working procedures and to do maintenance services. Here the icon positioning resource objects A and B belong to totally different networks, have a different protocol, data format, environments, etc. But they can share the same data in real-time. The Icon positioning resource object B can do the same thing vice versa to the icon positioning resource object A.

Continued in this example, manager A has another customer D who has another IoT shop in Australia but with a totally different standard, environment, and IoT provider.

Customer D wants help to fix some electrical problems in the facility in Customer D's shop. Manager A does not need to download D's new IoT app, but just use customer D's icon positioning resource object in manager A's single app same as customer B. The icon positioning resource object D has a Unique Icon Positioning Identification Number D00003, A receives D's request through the CIPIMS server, then sends back a response to the CIPIMS server, all steps same as above listed as for customer B.

The invention is also directed to an embodiment of a method of unified Internet integration for a positioning-oriented architecture comprises the steps of (a) receiving at least one icon positioning resource object by a controllable icon positioning information management service (CIPIMS) server, wherein the CIPIMS server further comprises a memory, and a computer processor further comprising a POA object receiver module, a POA object parser module, a POA object data validator module, a POA object processor and transformer module, a POA object assembler module, a POA security module, and a POA object sender module; (b) assigning a Unique Icon Positioning Identification Number for each of the at least one icon positioning resource object when the at least one icon positioning resource object is first received by the process of the CIPIMS server, wherein the Unique Icon Positioning Identification Number is assigned based on at least a latitude value, a longitude value, and an altitude value of the at least one icon positioning resource object or alternatively based on a predefined convention rule, wherein the at least one icon positing resource object is from an online activity; (c) storing a plurality of information of the at least one icon positioning resource object in an icon positioning resource object database; (d) exchanging the at least one icon positioning resource object between the CIPIMS server and at least one network through an icon positioning object information bus; and (e) communicating with the at least one icon positioning resource object through the icon positioning object information bus.

Figure 5A:
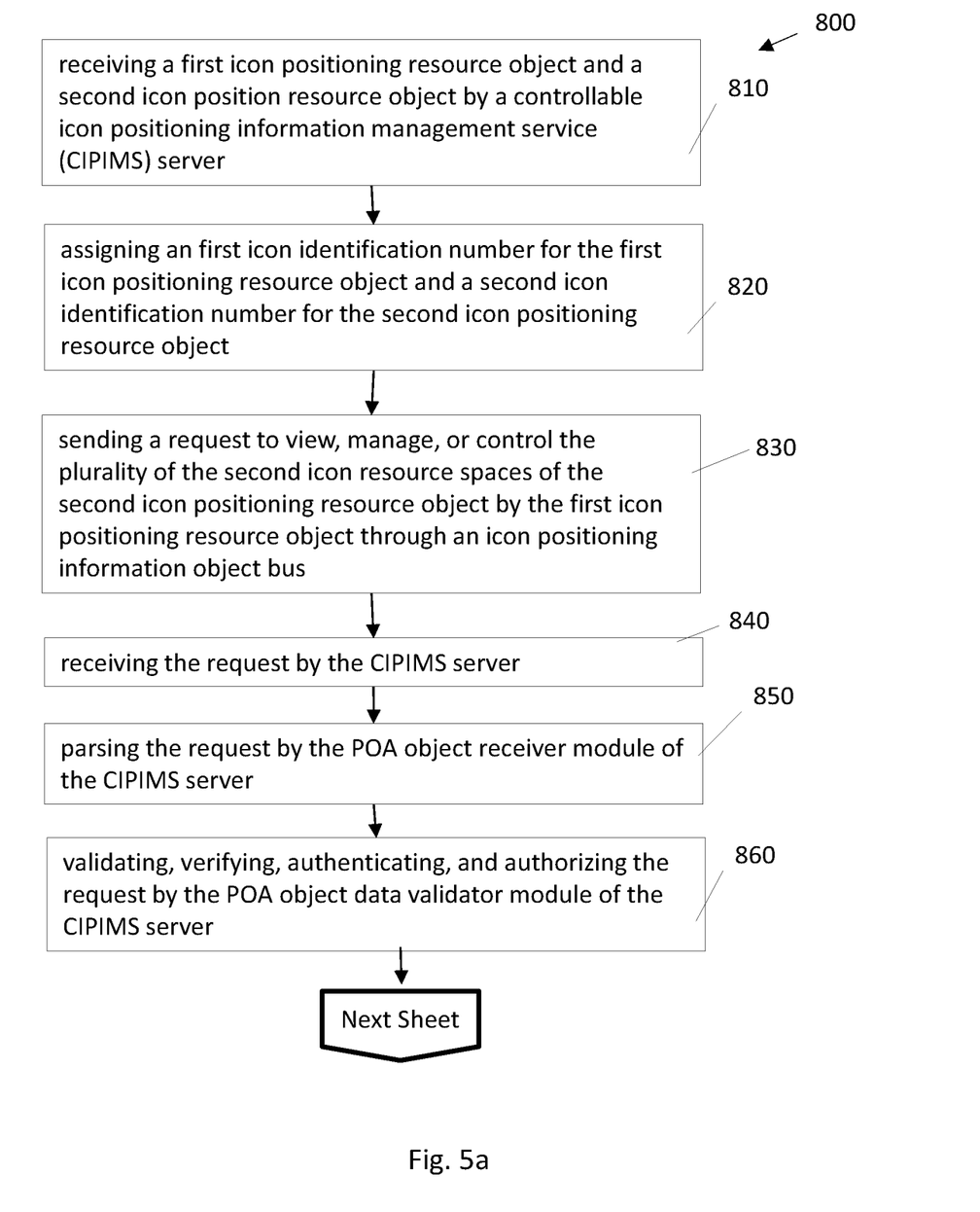
FIG. 5a is a simplified flowchart showing another embodiment of a UII method.
Figure 5B:
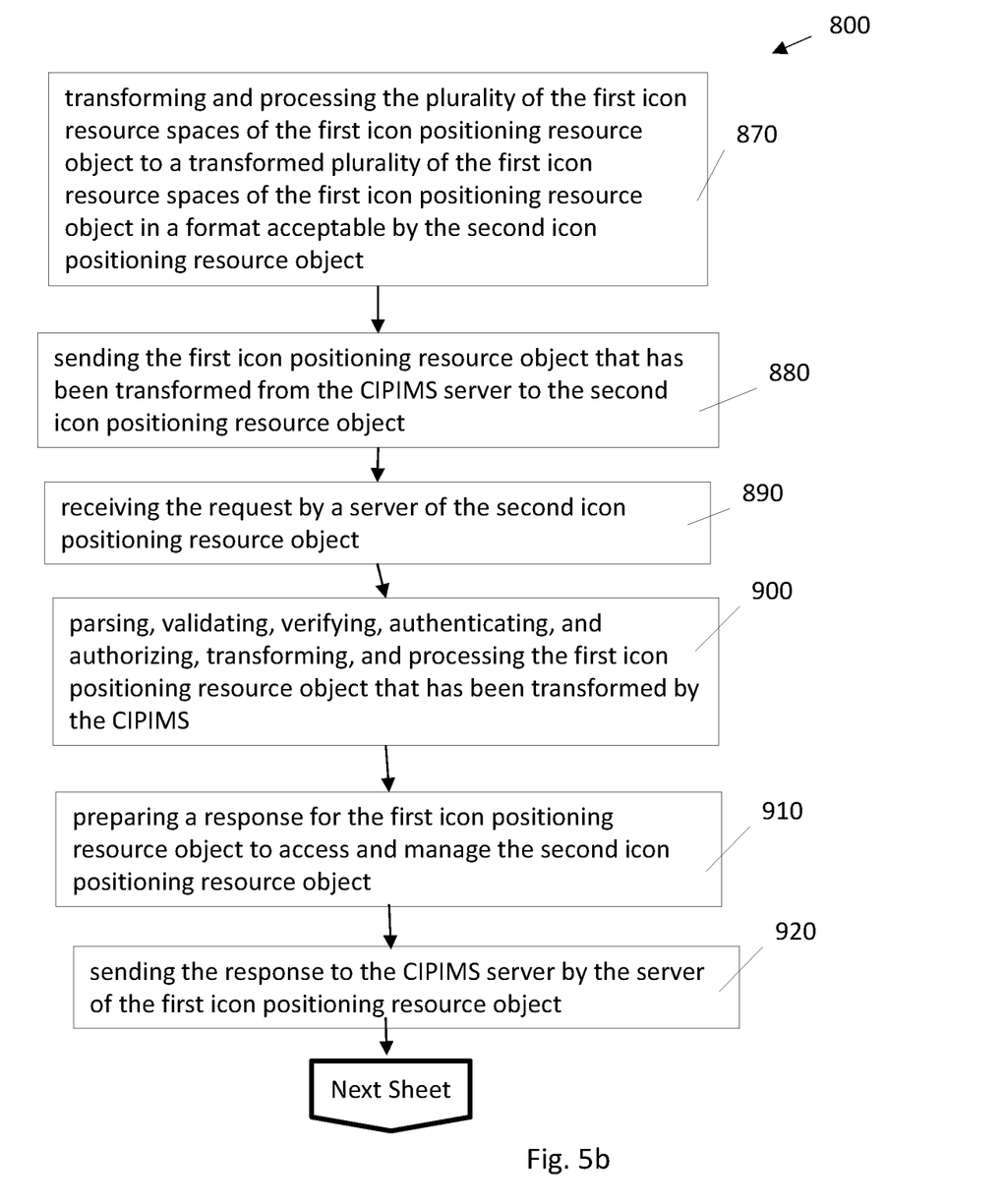
FIG. 5b is a simplified flowchart showing another embodiment of a UII method (continuation of FIG. 5a).
Figure 5C:
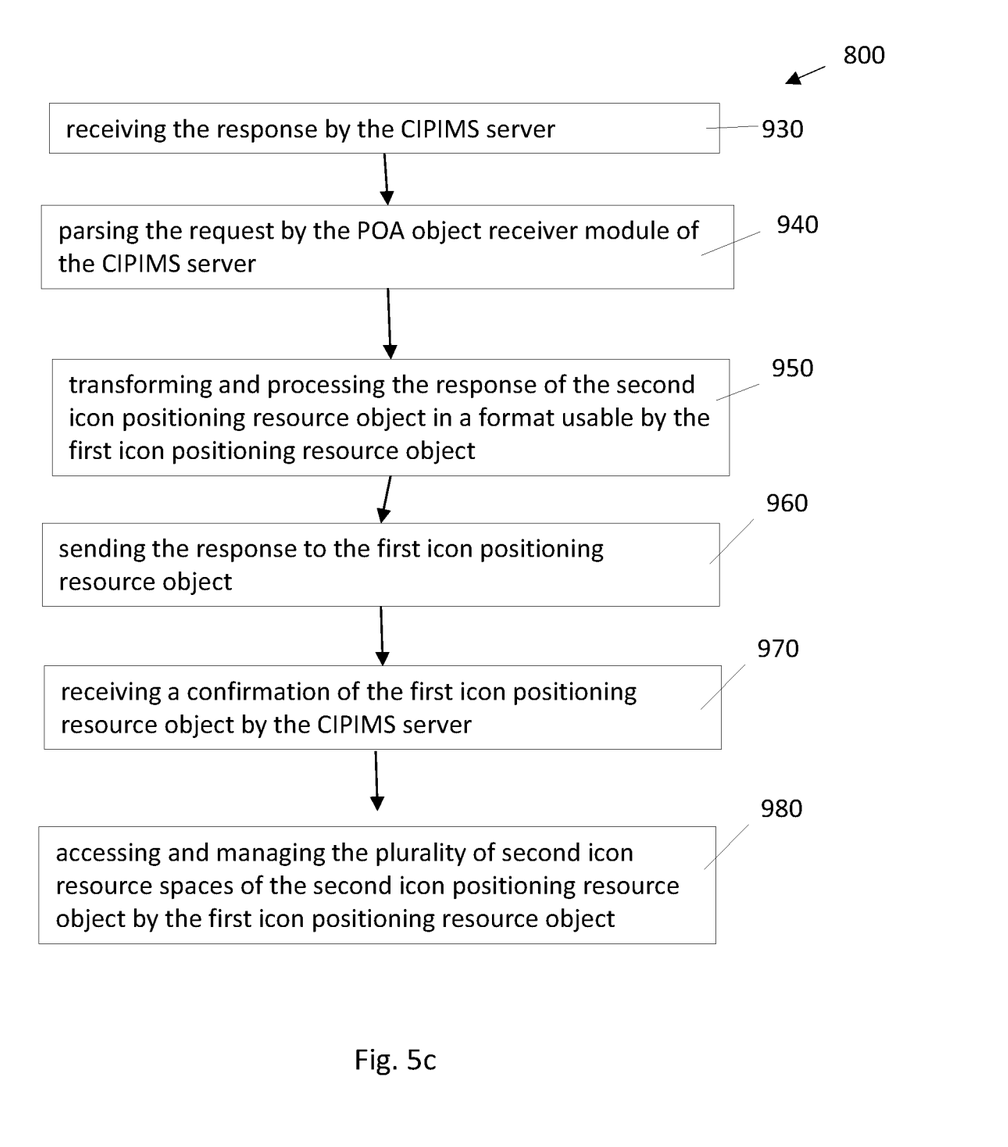
FIG. 5c is a simplified flowchart showing another embodiment of a UII method (continuation of FIG. 5b).

As shown in FIGS. 5.a, 5.b, 5.c, in one embodiment, a method 800 of unified Internet integration for a positioning-oriented architecture (POA) comprising the steps below. At step 810, receiving a first icon positioning resource object and a second icon position resource object by a controllable icon positioning information management service (CIPIMS) server, wherein the first icon positioning resource object comprising a plurality of first icon positioning resource spaces; wherein the second icon positioning resource object comprising a plurality of second icon positioning resource spaces; wherein the CIPIMS server further comprises; a memory, and a computer processor further comprising a POA object receiver module, a POA object parser module, a POA object data validator module, a POA object processor and transformer module, a POA object assembler module, and a POA object sender module. At step 820, assigning a first Unique Icon Positioning Identification Number for the first icon positioning resource object and a second Unique Icon Positioning Identification Number for the second icon positioning resource object, wherein the first and second Unique Icon Positioning Identification Numbers are assigned based on latitude values, longitude values, and altitude values of the first and second icon positioning resource objects or alternatively based on a predefined convention rule. At step 830, sending a request to view, manage, or control the plurality of the second icon positioning resource spaces of the second icon positioning resource object by the first icon positioning resource object through an icon positioning information object bus, wherein the request comprises the Unique Icon Positioning Identification Number of the second icon positioning resource object, a network address or a Uniform Resource Locator (URL) of the second icon positioning resource object, a plurality of messages of the second icon positioning resource object, and a plurality of response with the data format required by the second icon positioning resource object, all need to be returned to the first icon positioning resource object. At step 840, receiving the request by the process of the CIPIMS server. At step 850, parsing the request by the POA object receiver module of the CIPIMS server. At step 860, validating, verifying, authenticating, and authorizing the request by the POA object data validator module of the CIPIMS server. At step 870, transforming and processing the plurality of the first icon positioning resource spaces of the first icon positioning resource object to a transformed plurality of the first icon positioning resource spaces of the first icon positioning resource object in a format acceptable by the second icon positioning resource object. At step 880, sending the first icon positioning resource object that has been transformed from the CIPIMS server to the second icon positioning resource object. At step 890, receiving the request by a server of the second icon positioning resource object. At step 900, parsing, validating, verifying, authenticating, and authorizing, transforming, and processing the first icon positioning resource object that has been transformed by the CIPIMS. At step 910, preparing a response for the first icon positioning resource object to access and manage the second icon positioning resource object. At step 920, sending the response to the CIPIMS server by the server of the first icon positioning resource object. At step 930, receiving the response by the process of the CIPIMS server. At step 940, parsing the request by the POA object receiver module of the CIPIMS server. At step 950, transforming and processing the response of the second icon positioning resource object in a format usable by the first icon positioning resource object. At step 960, sending the response to the first icon positioning resource object. At step 970, receiving a confirmation of the first icon positioning resource object by the process of the CIPIMS server, wherein the confirmation permits the CIPIMS server to set up a connection tunnel to connect the first and the second icon positioning resource objects. At step 980, accessing and managing the plurality of second icon positioning resource spaces of the second icon positioning resource object by the first icon positioning resource object.

In one embodiment of the method, an example is shown as the follows: a user sends a request to a controllable icon positioning information management service (CIPIMS) server from an application residing in the user's device (computer, cellphone), wherein the request encapsulates all the information in the icon positioning resource object with a data format of the POA data structure containing (a high level description of the data structures including the UNIQUE ICON POSITIONING IDENTIFICATION NUMBER, all field name, attribute. etc.). The request with the icon positioning resource object with a Unique Icon Positioning Identification Number of 1000001 is sent to the CIPIMS server through Hypertext Transfer Protocol (HTTP) or Hypertext Transfer Protocol Secure (HTTPS), and the CIPIMS server receives the icon positioning resource object. The CIPIMS server will invoke a corresponding process to parse the icon positioning resource object that just received from the request, and separate all different service requirements. The CIPIMS server will invoke different processes, programs, and service algorithms to handle all different types of requirements based on the parsed results in the previous step according to different service requirements. The CIPIMS server will call backend systems to retrieve all related information stored in the icon positioning resource object database by the UNIQUE ICON POSITIONING IDENTIFICATION NUMBER of 1000001 and if necessary, to call other legacy systems to get data needed to process requested services or to get other related icon positioning resource objects information from backend system through their Unique Icon Positioning Identification Number. Finally to pack all processed results (including group of related icon positioning resource objects) into one icon positioning resource object in a POA data format, and to return the requested processing result as icon positioning resource object to the user TESTER in an encapsulated package, and simultaneously stores all the icon information processed into the icon positioning resource object database by the UNIQUE ICON POSITIONING IDENTIFICATION NUMBER of 1000001. The user TESTER's application on the user's device receives the icon positioning resource object with Unique Icon Positioning Identification Number of 1000001, then process the all information contained in the icon positioning resource object from the CIPIMS server. The application on the user's device will start decrypting, validating, parsing, processing, and obtaining the required result to display on the user interface of the application. If the algorithm is not working normally, the system will process the operation result accordingly to handle any error and exceptions. If the algorithm runs normally, the system will display all the results on the user interface of an application on the user's device after all operations will be completed.

Figure 6:
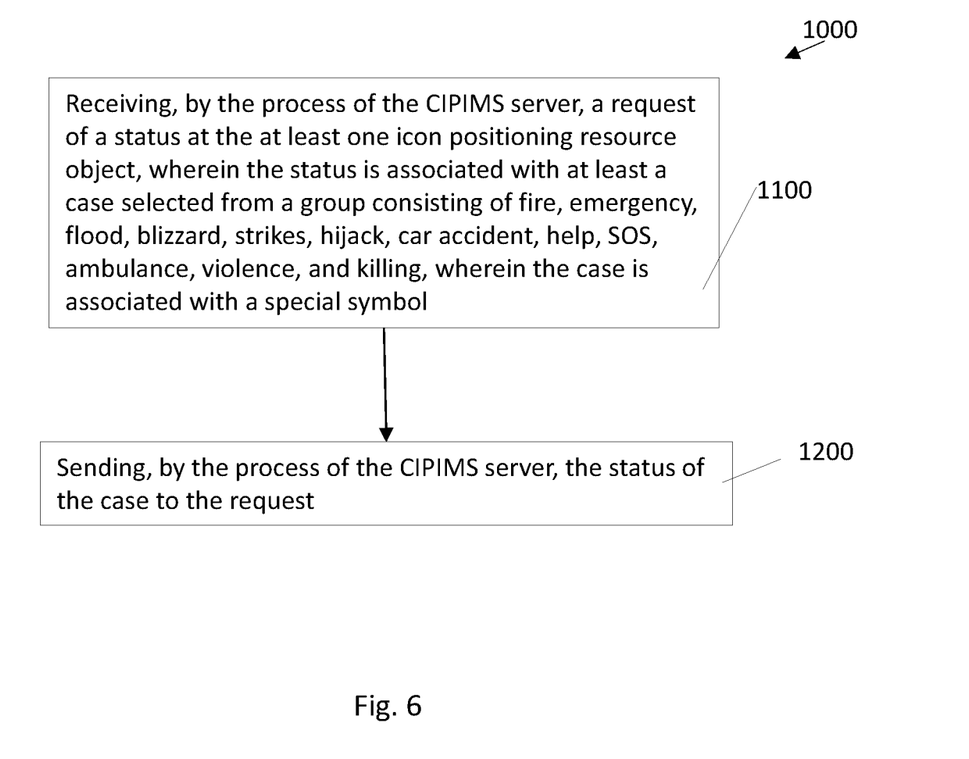
FIG. 6 is a simplified flowchart showing another embodiment of a UII method for icon positioning resource status management.

As shown in FIG. 6, in one of the embodiments, the method of unified Internet integration of claim further comprises a process 1000 for the icon positioning resource management: at Step 1100, receiving, by the process of the CIPIMS server 300, a request of a status at the at least one icon positioning resource object, wherein the status is associated with at least a case selected from a group consisting of fire, emergency, flood, blizzard, strikes, hijack, car accident, help, SOS, ambulance, violence, and killing, wherein the case is associated with a special symbol; and (b) at Step 1200, sending, by the process of the CIPIMS server, the status of the case to the request. The request is sent by an icon positioning resource object and received by the icon positioning resource status management 600 or icon positioning resource status management module 290 of the CIPIMS server 303 to request the status changes for all icon positioning resource objects collected in an application from a user's device. The status can be associated with the following cases selected from, but not limited to, fire, emergency, flood, blizzard, strikes, hijack, car accident, help, SOS, ambulance, violence, killing, others Each case has a special symbol to represent it. Once one or more of those cases happen, the status associated with the situation of the icon positioning resource object will be sent by the transferred from the icon positioning resource status management 600 or the icon positioning resource status management module 290 of the icon positioning information management service (CIPIMS) server to the application requesting the status and all the symbols of the status will be displayed on the icons in the application allowing the user to monitor all different emergency cases. A webpage or tab(s) used as a container inside the application of the user icon to hold or contain all the icon positioning resource objects, properties, and status. The status for each icon positioning resource object is collected by the process of the CIPIMS server from each application. A user has no privilege to change any status of any icon positioning resource object in the application of the user's device except authorization or permission.

Having described the subject matter of the present disclosure detailed description of embodiments and examples for purposes of clarity of understanding to a person having ordinary skill in the art that the same can be performed by modifying or changing the subject matter within various conditions, by various structures and by other parameters without affecting its scope or any specific embodiment thereof, and that such modifications or changes are intended to be encompassed within the scope of the claims.

What claimed is:

1. A unified Internet integration system for a positioning-oriented architecture (POA), comprising:
   a controllable icon positioning information management service (CIPIMS) server;
   an icon positioning object information bus;
   at least one icon positioning resource object;
   at least one network application;
   at least one network;
   wherein the CIPIMS server further comprises
      a memory,
      an icon positioning resource object database, and
      a computer processor further comprising
         a POA object receiver module,
         a POA object parser module,
         a POA object data validator module,
         a POA object processor and transformer module,
         a POA object assembler module,
         a POA object security module, and
         a POA object sender module;
   wherein the POA further comprises at least one unique icon positioning identification number, at least one icon positioning resource, at least one icon positioning resource space management, at least one icon positioning resource management, at least one icon positioning external resource links with Internet protocol address, and at least one icon positioning resource status management;
   wherein the at least one icon positioning resource comprises at least a longitude value, a latitude value, and an altitude value, or alternatively a predefined convention rule;
   wherein the at least one icon positioning resource space management comprises at least one icon positioning resource space and wherein the at least one icon positioning resource space management the at least one icon positioning resource can be created, deleted, added, cloned, linked, updated by the at least one icon positioning resource space management;
   wherein the at least one icon positioning resource management further comprises at least one icon group, wherein the at least one icon group can contain the at least one icon positioning resource object, wherein the at least one icon group can be created, deleted, added, clone, link, updated, sent, published, canceled, blacklisted, notified, blocked, accepted, included, and excluded by the at least one icon positioning resource management;
   wherein the at least one icon positioning external resource links with Internet protocol address may comprise at least one Internet protocol address under a resource-oriented architecture;
   wherein each of the at least one Internet protocol address may further comprise at least one service under a service-oriented architecture;

wherein the at least one icon positioning resource status management comprises a status of the at least one icon positioning resource object and responses to a request of the status;

wherein each of the at least one icon positioning resource space comprises at least one web page;

wherein the at least one icon positing resource object is from an online activity, and wherein the CIPIMS server communicates with the at least one icon positioning resource object through the icon positioning object information bus;

wherein the icon positioning resource object database stores a plurality of information of the at least one icon positioning resource object; and wherein the at least one icon positioning resource object is exchanged between the CIPIMS server and the at least one network through the icon positioning object information bus.

2. The unified Internet integration system of claim 1, wherein the at least one icon positioning resource object comprises a message.

3. The unified Internet integration system of claim 1, wherein the at least one icon positioning resource object comprises a service.

4. The unified Internet integration system of claim 1, wherein the at least one icon positioning resource object comprises an Internet protocol address.

5. The unified Internet integration system of claim 1, wherein the at least one network can be an Internet of Thing (IoT), a Geographical Information System (GIS) platform, a map platform, a social platform, an E-commerce platform, a travel platform, or a transportation platform.

6. The unified Internet integration system of claim 1, wherein one of the at least one icon positioning resource object can send a request and receive an authorization through the CIPIMS server to access and manage the at least one icon positioning resource space of another of the at least one icon positioning resource object when there are more than one of the at least one icon positioning resource object; and wherein the one of the at least one icon positioning resource object and another one of the at least one icon positioning resource can connect and communicate directly after the CIPIMS server establish a connection tunnel between the one and the another one of at least one icon positioning resource object.

7. A unified Internet integration system for a positioning-oriented architecture (POA), comprising:
   a controllable icon positioning information management service (CIPIMS) server;
   an icon positioning object information bus;
   at least one icon positioning resource object;
   at least one network application;
   at least one network;
   wherein the CIPIMS server further comprises
      a memory,
      an icon positioning resource object database, and
      a computer processor further comprising
         a POA object receiver module,
         a POA object parser module,
         a POA object data validator module,
         a POA object processor and transformer module,
         a POA object assembler module,
         a POA object security module,
         a POA object sender module,
         an icon positioning resource management module,
         an icon positioning resource space management module,
         an icon positioning external resource links module, and
         an icon positioning resource status management module;

wherein each of the at least one icon positioning resource object further comprising at least one unique icon positioning identification number, wherein the Unique Icon Positioning Identification Number is a root element;

wherein each of the at least one icon positioning resource object further comprises at least one icon positioning resource space;

wherein each of the at least one icon positioning resource space comprises at least a plurality of web pages, wherein the CIPIMS server assigns the at least one unique icon positioning identification number for each of the at least one icon positioning resource object when the at least one icon positioning resource object is first received by the process of the CIPIMS server;

wherein the icon positioning resource space management module can have a plurality of operations comprising creating, deleting, cloning, linking, and updating the at least one icon positioning resource space of an icon positioning resource object, each space comprises at least one webpage or at least one WebView;

wherein the icon positioning resource management module further comprises at least one icon group, wherein the at least one icon group can contain the at least one icon positioning resource object;

wherein the icon positioning resource management module can create, delete, add, clone, link, update, send, publish, cancel, blacklist, notify, block, accept, exclude, and include the at least one icon group and the at least one icon positioning resource object;

wherein the Unique Icon Positioning Identification Number is assigned based on at least a latitude value, a longitude value, and an altitude value of the at least one icon positioning resource object or alternatively based on a predefined convention rule;

wherein the icon positioning resource status management module comprises a status of the at least one icon positioning resource object and responses to a request of the status;

wherein the at least one icon positing resource object is from an online activity, and wherein the CIPIMS server communicates with the at least one icon positioning resource object through the icon positioning object information bus;

wherein the icon positioning resource object database stores a plurality of information of the at least one icon positioning resource object; and wherein the at least one icon positioning resource object is exchanged between the CIPIMS server and the at least one network through the icon positioning object information bus.

8. The unified Internet integration system of claim 7, wherein the at least one icon positioning resource object comprises a message.

9. The unified Internet integration system of claim 7, wherein the at least one icon positioning resource object comprises a service.

10. The unified Internet integration system of claim 7, wherein the at least one icon positioning resource object comprises an Internet protocol address.

11. The unified Internet integration system of claim 7, wherein the at least one network can be an Internet of Thing (IoT), a Geographical Information System (GIS) platform, a map platform, a social platform, an E-commerce platform, a travel platform, or a transportation platform.

12. The unified Internet integration system of claim 7, wherein one of the at least one icon positioning resource object can send a request and receive an authorization through the CIPIMS server to access and manage the at least one icon positioning resource space of another one of the at least one icon positioning resource object when there are more than two of the at least one icon positioning resource object; and wherein the one of the at least one icon positioning resource object and another one of the at least one icon positioning resource can connect and communicate directly after the CIPIMS server establish a connection tunnel between the one and the another one of at least one icon positioning resource object.

13. A method of unified Internet integration for a positioning-oriented architecture (POA), comprising:
   (a) receiving at least one icon positioning resource object by a controllable icon positioning information management service (CIPIMS) server, wherein the CIPIMS server further comprises
      a memory, and
      a computer processor further comprising
         a POA object receiver module,
         a POA object parser module,
         a POA object data validator module,
         a POA object processor and transformer module,
         a POA object assembler module,
         a POA security module, and
         a POA object sender module;
   (b) assigning a Unique Icon Positioning Identification Number for each of the at least one icon positioning resource object when the at least one icon positioning resource object is first received by the process of the CIPIMS server, wherein the Unique Icon Positioning Identification Number is assigned based on at least a latitude value, a longitude value, and an altitude value of the at least one icon positioning resource object or alternatively based on a predefined convention rule;
   (c) storing a plurality of information of the at least one icon positioning resource object in an icon positioning resource object database;
   (d) exchanging the at least one icon positioning resource object between the CIPIMS server and at least one network through an icon positioning object information bus; and
   (e) communicating with the at least one icon positioning resource object through the icon positioning information object bus.

14. The method of unified Internet integration of claim 13, wherein the at least one icon positioning resource object comprises a message.

15. The method of unified Internet integration of claim 13, wherein the at least one icon positioning resource object comprises a service.

16. The method of unified Internet integration of claim 13, wherein the at least one icon positioning resource object comprises an Internet protocol address.

17. The method of unified Internet integration of claim 13, further comprising: creating, deleting, cloning, linking, and updating a plurality of icon positioning resource spaces of an icon positioning resource object by an icon positioning resource space management module.

18. The method of unified Internet integration of claim 13, wherein the at least one network can be an Internet of Thing, a Geographical Information System platform, a map platform, a social platform, and E-commerce platform, a travel platform, or a transportation platform.

19. The method of unified Internet integration of claim 13, further comprising:
   (a) receiving, by the process of the CIPIMS server, a first icon positioning resource object and a second icon position resource object by the controllable icon positioning information management service (CIPIMS) server;
   wherein the first icon positioning resource object comprising a plurality of first icon positioning resource spaces;
   wherein the second icon positioning resource object comprising a plurality of second icon positioning resource spaces;
   (b) assigning, by the process of the CIPIMS server, a first Unique Icon Positioning Identification Number for the first icon positioning resource object and a second Unique Icon Positioning Identification Number for the second icon positioning resource object, wherein the first and second Unique Icon Positioning Identification Numbers are assigned;
   (c) sending, by the first icon positioning resource object, a request to view, manage, or control the plurality of the second icon positioning resource spaces of the second icon positioning resource object through an icon positioning information object bus, wherein the request comprises the second Unique Icon Positioning Identification Number of the second icon positioning resource object, a network address or a Uniform Resource Locator (URL) of the second icon positioning resource object, a plurality of message of the second icon positioning resource object, and a plurality of responses with a data format required by the second icon positioning resource object required to be returned to the first icon positioning resource object;
   (d) receiving, by the process of the CIPIMS server, the request;
   (e) parsing the request by the POA object receiver module of the CIPIMS server;
   (f) validating, verifying, authenticating, and authorizing the request by the POA object data validator module of the CIPIMS server;
   (g) transforming and processing, by the process of the CIPIMS server, the plurality of the first icon positioning resource spaces of the first icon positioning resource object to a transformed plurality of the first icon positioning resource spaces of the first icon positioning resource object in a format acceptable by the second icon positioning resource object;
   (h) sending, by the process of the CIPIMS server, the first icon positioning resource object that has been transformed from the CIPIMS server to the second icon positioning resource object;
   (i) receiving the request of the second icon positioning resource object by the process of the CIPIMS;
   (j) parsing, validating, verifying, authenticating, and authorizing, transforming, and processing the first icon positioning resource object that has been transformed by the process of the CIPIMS;
   (k) preparing a response for the first icon positioning resource object to access and manage the second icon positioning resource object by the first icon positioning resource object;
   (l) sending the response to the CIPIMS server by the first icon positioning resource object;
   (m) receiving the response by process of the CIPIMS server;

(n) parsing the request by the POA object receiver module of the CIPIMS server;
(o) transforming and processing the response of the second icon positioning resource object in a format usable by the first icon positioning resource object;
(p) sending the response to the first icon positioning resource object by the process of the CIPIMS server;
(q) receiving a confirmation of the first icon positioning resource object by the process of the CIPIMS server, wherein the confirmation permits the CIPIMS server to set up a connection tunnel to connect the first and the second icon positioning resource objects; and
(r) accessing and managing the plurality of second icon positioning resource spaces of the second icon positioning resource object by the first icon positioning resource object.

20. The method of unified Internet integration of claim 13, further comprising:
(a) Receiving, by the process of the CIPIMS server, a request of a status at the at least one icon positioning resource object, wherein the status is associated with at least a case selected from a group consisting of fire, emergency, flood, blizzard, strikes, hijack, car accident, help, SOS, ambulance, violence, and killing, wherein the case is associated with a special symbol; and
(b) Sending, by the process of the CIPIMS server, the status of the case to the request.

* * * * *